US009643549B2

(12) United States Patent
Guittonneau

(10) Patent No.: US 9,643,549 B2
(45) Date of Patent: May 9, 2017

(54) ELECTRONIC CIRCUIT COMPRISING TWO STATIC CONVERTERS OPERATING IN A QUASI-RESONANT ZERO-VOLTAGE SWITCHING MODE AND A METHOD OF OPERATING SUCH A CIRCUIT

(75) Inventor: Franck Guittonneau, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 822 days.

(21) Appl. No.: 14/000,455

(22) PCT Filed: Mar. 30, 2012

(86) PCT No.: PCT/EP2012/001406
§ 371 (c)(1),
(2), (4) Date: Aug. 20, 2013

(87) PCT Pub. No.: WO2012/136330
PCT Pub. Date: Oct. 11, 2012

(65) Prior Publication Data
US 2013/0328394 A1 Dec. 12, 2013

(30) Foreign Application Priority Data
Apr. 8, 2011 (FR) ...................... 11 01071

(51) Int. Cl.
*B60L 1/00* (2006.01)
*B60R 16/03* (2006.01)
(Continued)

(52) U.S. Cl.
CPC ............. *B60R 16/03* (2013.01); *H02M 1/083* (2013.01); *H02M 3/1584* (2013.01); *H02M 2003/1586* (2013.01); *Y02B 70/1425* (2013.01)

(58) Field of Classification Search
CPC ........ B60L 11/1809; B60L 1/00; B60R 16/00; B60R 21/02; B60R 1/00
(Continued)

(56) References Cited

U.S. PATENT DOCUMENTS 5,262,930 A * 11/1993 Hua ...................... H02M 3/158
323/222
2006/0077604 A1* 4/2006 Jansen .................... H02J 1/102
361/90

(Continued)

OTHER PUBLICATIONS

International Search Report dated Aug. 3, 2012, corresponding to PCT/EP2012/001406.
(Continued)

*Primary Examiner* — Jared Fureman
*Assistant Examiner* — Joseph Inge
(74) *Attorney, Agent, or Firm* — Young & Thompson

(57) ABSTRACT

A method of operating an electronic circuit including:
a master converter including a master controller and a switch,
a slave converter including a slave controller and a switch, designed to step up an input voltage of the electronic circuit to an output voltage, each converter operating in a quasi-resonant mode by zero-voltage switching of their respective switch, wherein:
the master controller sends, when the master converter switch is turned on and when a preset phase-shift criterion is met, a control signal to the slave controller which turns off the slave converter switch,
the master and slave controllers turn on the switch of their respective converter as soon as a zero voltage is detected across the terminals of the switch,
wherein the electric current magnitude in the master converter switch is measured, and the preset phase-shift criterion is met when the measured magnitude reaches a preset value.

14 Claims, 2 Drawing Sheets

Figure 1:
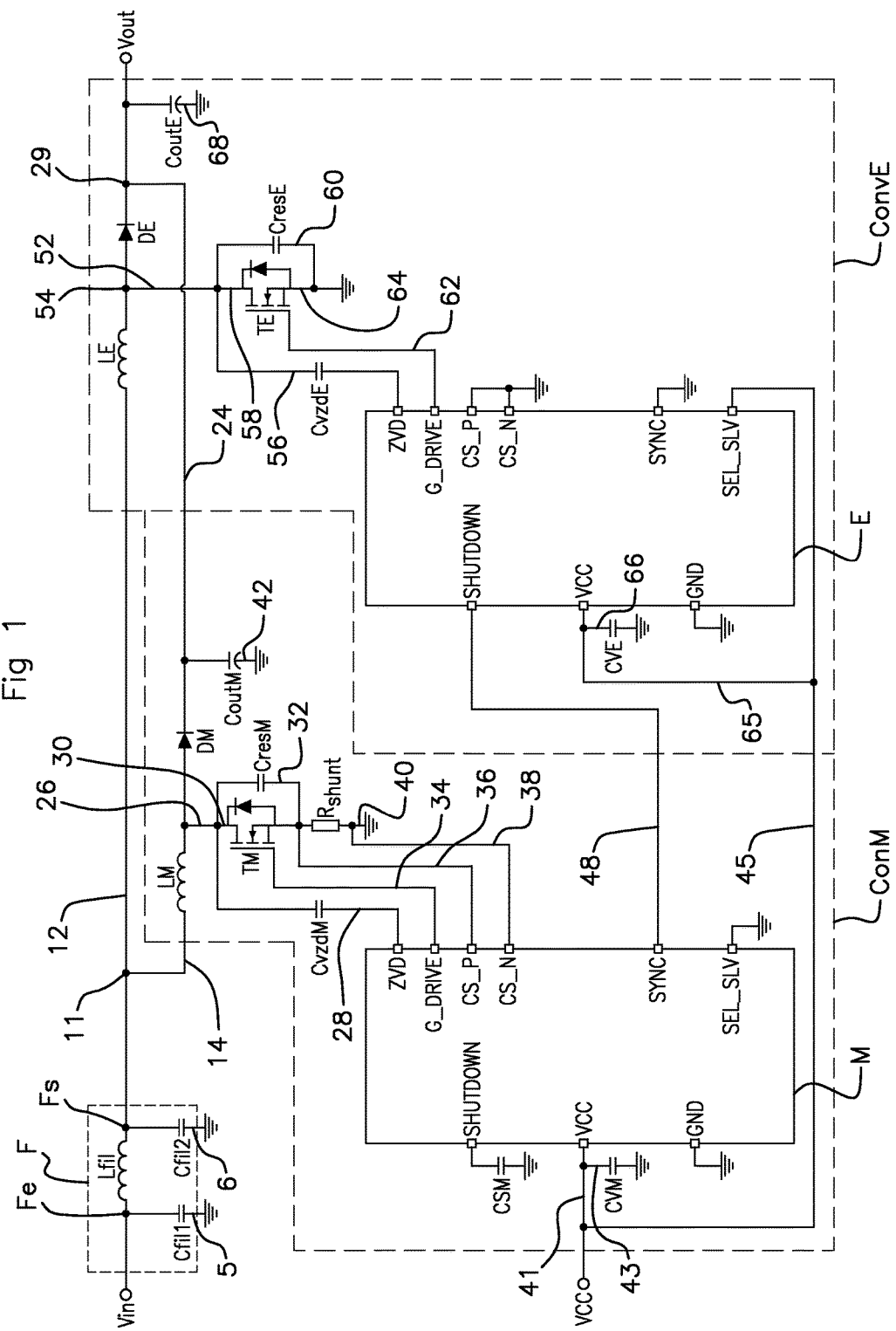

(51) Int. Cl.
*H02M 1/08* (2006.01)
*H02M 3/158* (2006.01)
(58) Field of Classification Search
USPC .......................................................... 307/10.1
See application file for complete search history.

(56) References Cited

U.S. PATENT DOCUMENTS

| | | | | |
|---|---|---|---|---|
| 2008/0094866 A1* | 4/2008 | Bauman | .................. | H02M 1/34 363/50 |
| 2009/0168475 A1* | 7/2009 | Hirosawa | ............ | H02M 3/1584 363/84 |
| 2012/0026754 A1* | 2/2012 | Ye | ......................... | H02M 3/285 363/17 |

OTHER PUBLICATIONS

Huber Laszlo, et al.; "Implementation of Open-Loop Control for Interleaved DCM/CCM Boundary Boost PFC Converters"; Feb. 24, 2008; pp. 1010-1016.
T-F Wu, et al.; "Integrated Circuits of a PFC Controlller for Interleaved Critical-Mode Boost Converters"; Feb. 1, 2007; pp. 1347-1350.
P. Jose, et al.; A Novel Bidirectional DC-DC Converter with ZVS and Interleaving for Dual Voltage Systems in Automobiles; Oct. 13, 2002; vol. 2 pp. 1311-1314.

* cited by examiner

ELECTRONIC CIRCUIT COMPRISING TWO STATIC CONVERTERS OPERATING IN A QUASI-RESONANT ZERO-VOLTAGE SWITCHING MODE AND A METHOD OF OPERATING SUCH A CIRCUIT

The present invention relates to an electronic circuit for a motor vehicle and a method of operating such a circuit. The technical field of the invention is, in general, that of voltage converters. More particularly, the invention relates to the control of two static converters designed to step up an input electric voltage provided by an accumulator in order to deliver a higher output voltage.

In the prior art, there are known controls, by Pulse Width Modulation (PWM), of electronic circuits comprising a step-up voltage converter of the DC/DC (Direct Current to Direct Current) type, operating in current mode and in quasi-resonant mode. The term "quasi-resonant converter" refers to a static converter in which one of the two switchings is natural and the other can be assisted. Such circuits use a zero switch triggering voltage across the terminals of their switch. When the end of a drain voltage drop is detected, a switch of the field effect transistor type is triggered.

PWM control is therefore dedicated to carrying out the zero-voltage triggering in order to reduce switching losses. This type of control requires the use of a current sensor in current mode and a zero voltage detector in quasi-resonant mode. It is recalled that in a quasi-resonant converter with zero-voltage triggering and current mode, there are three phases in a switching period.

During the first phase, a PWM controller detects a transistor voltage close to 0 V, triggers its transistor, and the current increases linearly through a coil starting from its negative value until it reaches a set current detection point.

During the second phase, called the freewheeling phase, the current detector of the circuit cuts off the transistor and the coil is demagnetized through the diode and the output of the DC/DC converter.

During the third phase, when the current in the coil is zero, the resonant capacitor discharges through the coil and provides a negative current. When the capacitor voltage reaches 0 V, another zero voltage is detected and another cycle begins.

However, in practice this type of circuit causes a large and therefore harmful ripple of the input current.

In the prior art, there are also known circuits associating several independent quasi-resonant step-up voltage converters in parallel in order to increase the available output power range.

However, in practice, this type of circuit exhibits a very troublesome triangular input current ripple with high peak current values at the level of its input filter, which considerably reduces its service life and makes it necessary to provide a suitable capacitor and significant filtering.

In the prior art, sometimes two converters are controlled, one of them operating as the master and the other one as the slave, in order to reduce the current ripple, but these do not therefore operate in quasi-resonant mode.

The invention proposes to solve the abovementioned technical problems.

In the invention, a circuit is produced comprising two interlaced step-up voltage converters, each of said converters being configured to operate in quasi-resonant mode with zero-voltage switchings.

The invention therefore relates to a method of operating an electronic circuit, said circuit comprising two static converters, one of them being a master converter notably comprising a master PWM controller and a switch and the other being a slave converter notably comprising a slave PWM controller and a switch, designed to step up an input voltage of the circuit in order to deliver a higher output voltage, each of said converters operating in a quasi-resonant mode by zero-voltage switching of their respective switch.

The method according to the invention comprises the following steps:
  the master PWM controller sends, when the switch of said master converter is turned on and when a preset phase-shift criterion is met, a control signal to the slave PWM controller which, in response to said control signal, turns off the switch of said slave converter,
  the master PWM controller and the slave PWM controller turn on the switch of their respective converter as soon as a zero voltage is detected across the terminals of said switch.

The invention is noteworthy in that said method comprises an additional step in which the magnitude of an electric current in the switch of the master converter is measured, the preset phase-shift criterion being met when said measured magnitude reaches a preset value.

The inventors have established that these arrangements are optimum and that switching losses are minimized due to these arrangements.

According to particular features, the preset value is between one third and two thirds of a preset peak value of said electric current in the switch of the master converter.

The inventors have established that these arrangements are optimum.

According to particular features, the input voltage of the electronic circuit is filtered by means of a low-pass filter.

The ripple of the input current of said circuit is minimized due to these arrangements.

According to particular features, the master PWM controller keeps the switch of the slave converter turned off, during a predefined operating phase of the circuit, as long as an output voltage of the circuit exceeds a preset value.

Due to these arrangements, the totality of the control and of the management of the particular events is carried out by means of a single logic signal.

The invention also relates to an electronic circuit comprising two static converters, one of them being a master converter notably comprising a master PWM controller and a switch and the other being a slave converter notably comprising a slave PWM controller and a switch, designed to step up an input voltage of the circuit in order to deliver a higher output voltage, each of said converters operating in a quasi-resonant mode by zero-voltage switching of their respective switch, this being a device in which:
  the master PWM controller is configured to send, when the switch of said master converter turned on and when a preset phase-shift criterion is met, a control signal to the slave PWM controller, said slave PWM controller being configured to turn off the switch of said slave converter in response to said control signal,
  the master PWM controller and the slave PWM controller are configured to turn on the switch of their respective converter as soon as a zero voltage is detected across the terminals of said switch.

According to the particular features of the invention, said circuit furthermore comprises means for measuring the magnitude of an electric current in the switch of the master converter, and the preset phase-shift criterion is met when said measured magnitude reaches a preset value.

As the advantages, purposes and particular features of this circuit are similar to those of the method which is the subject of the present invention, they will not be repeated here.

According to particular features, said circuit furthermore comprises a low-pass filter designed to filter the input voltage of the circuit, said filter preferably comprising an inductor coil and two capacitors.

According to particular features, the master PWM controller is configured to keep the switch of the slave converter turned off, during a predefined operating phase of the circuit, as long as the output voltage of said circuit exceeds a preset value.

The invention also relates to a vehicle of the motor vehicle type comprising such a circuit.

As the advantages, purposes and particular features of this vehicle are similar to those of the method that is the subject of the present invention, they are not repeated here.

The invention and its various applications will be better understood on reading the following description and on examining the figures accompanying it.

Figure 2:
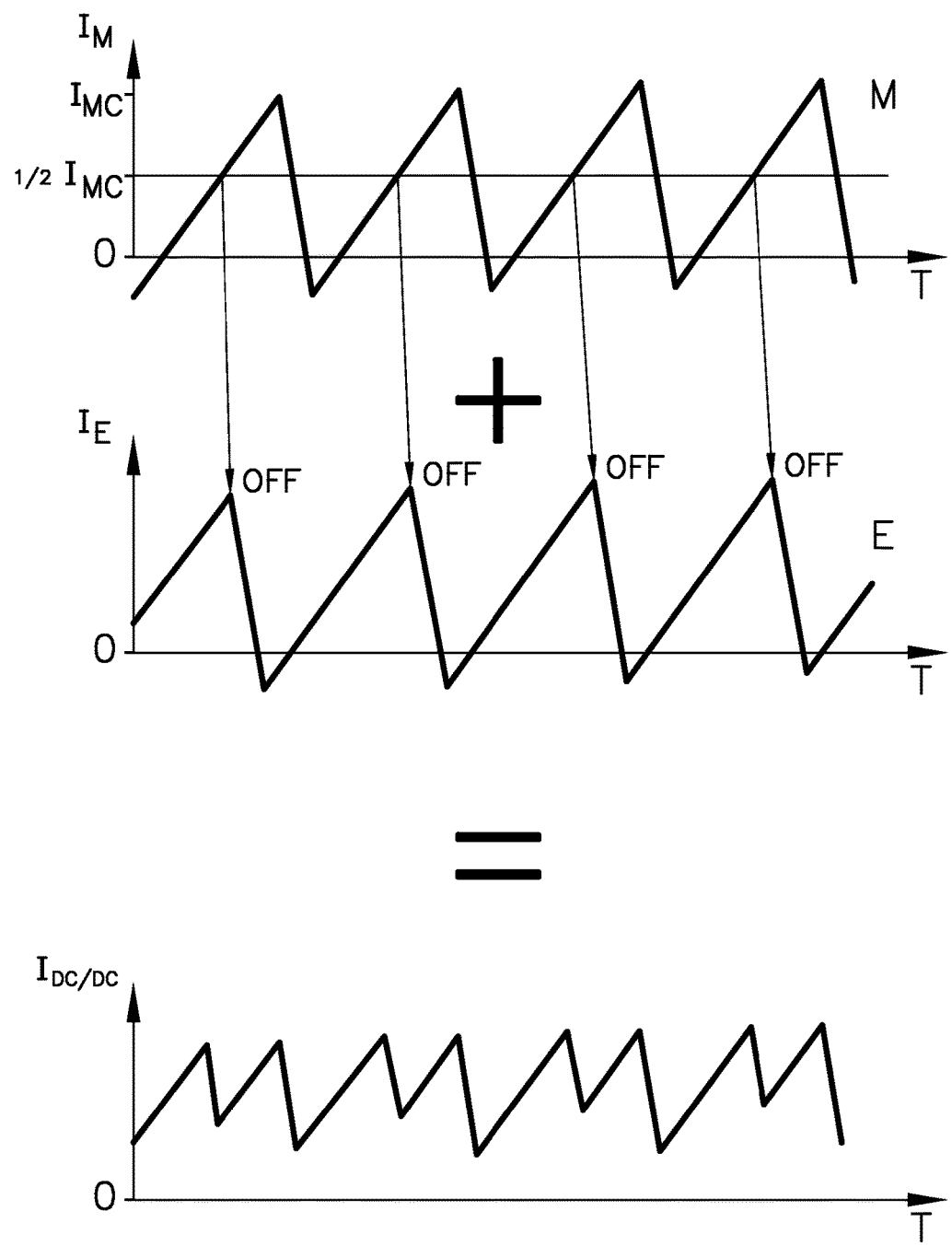

The latter are presented merely by way of wholly non-limiting indication of the invention. The figures show:

in FIG. 1, a circuit diagram of an electronic circuit of a vehicle according to an embodiment of the invention, in FIG. 2, a first graphical representation of a method for controlling said circuit according to an embodiment of the invention.

In these figures, the identical elements retain the same references.

FIG. 1 shows, in the form of a circuit diagram, an electronic circuit 10 of a vehicle according to an embodiment of the invention.

According to the invention, the circuit 10 comprises two static converters ConvM and ConvE of the DC/DC type designed to step up an input electric voltage Vin supplied by an accumulator, which is not shown, in order to deliver an output voltage Vout higher than the input voltage Vin.

One of said converters is configured to act as a master converter ConvM by means of a master PWM controller M and furthermore comprises a switch TM, an inductor coil LM, a diode DM, un shunt, symbolized by a resistor Rshunt, a resonant capacitor CresM and four capacitors CzvdM, CoutM, CSM and CVM.

The other one of said converters is configured to act as a slave converter ConvE by means of a slave PWM controller E and furthermore comprises a controller and a switch TE, an inductor coil LE, a diode DE, a resonant capacitor CresE and three capacitors CzvdE, CoutE and CVE.

Each of said converters operates in quasi-resonant mode by zero-voltage switching of their respective switch TM and TE.

The circuit 10 comprises, at its input, a low-pass filter F constituted by an inductor coil Lfil and two capacitors Cfil1 and Cfil2 disposed on either side of said coil. More precisely, the capacitor Cfil1 is disposed on a branch 5 connecting an input Fe of said filter to the electrical ground and the capacitor Cfil2 is disposed on a branch 6 connecting an output Fs of said filter to the electrical ground.

The low-pass filter F is designed to filter the input voltage Vin of the circuit 10, in order to limit its ripple.

At the output of the low-pass filter F, the circuit separates into two branches 12 and 14 at the point of intersection 11. The first branch 12 comprises the inductor coil LE and a diode DE disposed, in series and in that order, in order to provide, at its end, a voltage Vout.

The second branch 14 comprises the coil LM.

The branch 14, downstream of the coil LM, separates into two branches 24 and 26. The branch 24, comprising the diode DM, joins the branch 12 at a point of intersection 29. The branch 26 separates into three branches 28, 30 and 32.

The branch 28, comprising the capacitor CzvdM, is connected to the PWM controller M. The branch 30 comprises a switch TM which has two outputs 34 and 36. In one embodiment of the invention, the switch TM is a MOSFET transistor. In a variant, said switch is a simple switch.

The branch 32 comprises the resonant capacitor CresM placed in parallel with the transistor TM and joins the branch 36. The shunt is disposed on a branch 38 connected in parallel with respect to the branch 36. A branch 40 connects the branch 38 to the electrical ground.

A voltage VCC supplies the PWM controller M through a branch 41.

A branch 43 connects, via the decoupling capacitor CVM, the branch 41 to the electrical ground.

A branch 42 connects, via the capacitor CoutM, the branch 24 to the electrical ground.

A branch 52 is connected to the branch 12 at a point of intersection 54. The branch 52 separates into three branches 56, 58 and 60.

The branch 56, comprising the capacitor CzvdE, is connected to the PWM controller E. The branch 58 comprises the switch TE which has two outputs 62 and 64. The branch 62 connects the PWM controller E to the switch TE and the branch 64 connects said switch TE to the electrical ground. In one embodiment of the invention, the switch TE is a MOSFET transistor. In a variant, said switch is a simple switch.

The branch 60 comprises a capacitor CresE placed in parallel with the transistor TE and joins the branch 64.

The voltage VCC also supplies the PWM controller E through a branch 45 and a branch 65. A branch 66 connects, via the decoupling capacitor CVE, the branch 65 to the electrical ground.

Between the intersection 29 and the end of the branch 12, a branch 68 connects, via the capacitor CoutE, the branch 12 to the electrical ground.

The PWM controllers M and E are for example micro-controllers programmed, according to the invention, to implement the method described below.

In the non-limiting example shown, the PWM controllers M and E each comprise nine pins: SHUTDOWN, VCC, GND, SEL_SLV, SYNC, CS_N, CS_P, G_DRIVE and ZVD.

The pin VCC is the one through which the voltage VCC arrives. The pin VCC of the PWM controller M is connected to the branch 41. The pin VCC of the PWM controller E is connected to the branch 65.

The pin GND of each of the PWM controllers M and E is connected to the electrical ground.

The pin ZVD is the one through which the zero voltage detection information zvd arrives. The pin ZVD of the PWM controller M is connected to the branch 28. The pin ZVD of the PWM controller E is connected to the branch 56.

The pin G_DRIVE is used for controlling the switch TM, TE. The pin G_DRIVE of the PWM controller M is directly connected to the switch TM of the converter ConvM via the branch 34. The pin G_DRIVE of the PWM controller E is directly connected to the switch TE of the converter ConvE via the branch 62.

The pin SEL_SLV makes it possible to configure the PWM controllers M and E in master mode (by connecting it to the electrical ground) and in slave mode (by connecting it to the voltage VCC). The pin SEL_SLV of the PWM controller M is connected to the electrical ground, whilst the pin SEL_SLV of the PWM controller E is connected to the voltage VCC.

When the pin SEL_SLV is connected to the voltage VCC, the pin SHUTDOWN is activated and control signals received on this pin SHUTDOWN are interpreted by the PWM controller E in slave mode. In particular, when it is activated, the pin SHUTDOWN makes it possible to receive a control signal in response to which the PWM controller E in slave mode must turn off the switch TE, as will be described below.

The pin SHUTDOWN of the PWM master controller M is connected, via the capacitor CVM, to the electrical ground.

The pin SYNC is an output pin used for sending control signals. The pin SYNC is used by the master controller M for synchronizing the slave controller E. The pin SYNC of the PWM controller M is connected to the pin SHUTDOWN of the PWM controller E by a branch 48. The pin SYNC of the PWM controller E in slave mode is connected to the electrical ground.

The pins CS_N and CS_P are used by the PWM controller M in master mode for determining the magnitude of an electric current flowing in the switch TM, as will be described below. The pin CS_N and the pin CS_P of the PWM controller M are connected to the terminals of the resistor Rshunt by the branch 38 and the branch 36 respectively. The resistor Rshunt is used for measuring the magnitude of an electric current flowing in the switch TM.

The pins CS_N and CS_P of the PWM controller E in slave mode are connected directly to the electrical ground. In a preferred embodiment of the invention, the power of the circuit 10 is about 125 W.

FIG. 2 is a graphical illustration of the principle of a method of controlling said circuit according to a preferred implementation of the invention.

The input current of a quasi-resonant converter of the prior art exhibits a triangular waveform with a large ripple. In order to reduce this ripple, in the invention, the two DC/DC converters ConvM and ConvE placed in parallel are used, with the same switching frequency and a phase shift.

The converters ConvM and ConvE are configured to operate in quasi-resonant mode by switching, that is to say by turning on, or putting in the ON state, their respective switch, and by turning off, or putting in the OFF state, their respective switch.

The master converter ConvM is configured to send, when its switch TM is turned on and when a preset phase-shift criterion is met, a control signal to the slave converter ConvE which, in response to said control signal, turns off its switch TE.

The master converter ConvM and the slave converter ConvE are configured to autonomously turn on their respective switch TM and TE as soon as a zero voltage zvd is detected across the terminals of their switch, the voltage zvd being measured via the pin ZVD of their PWM controller.

In a preferred example embodiment of the invention, the preset phase-shift criterion is met when the measured magnitude Im reaches a preset value.

In this example, the preset current magnitude Im is half of a peak value Imc of said current. More generally, the preset current magnitude Im is between one third and two thirds of the peak value Imc.

The method for controlling the electronic circuit 10 according to one embodiment of the invention comprises the steps in which:

the magnitude Im of the electric current in the switch TM of the master converter ConvM is measured, in order to detect the zero voltages zvd, the input voltage Vin of the electronic circuit 10 is filtered by means of the low-pass filter F, the Master PWM controller M keeps the switch TE of the slave converter ConvE turned off, during a predefined operating phase of the circuit, as long as an output voltage Vout of the circuit exceeds a preset threshold value.

Typically, the value of this voltage threshold is preset as a function of the voltages that can be withstood by the different electronic components of said circuit.

The master converter ConvM must control the slave converter ConvE in such a way as to obtain the same frequency and a suitable delay in order to reduce the input ripple.

In the switching structures of the prior art, this control is carried out by putting the slave converter ConvE in the ON state, this converter remaining autonomous with regard to switching OFF in current mode.

According to the invention, putting the slave converter ConvE in the ON state, that is to say turning on the switch TE, is carried out autonomously by the slave PWM controller E by detection of a zero voltage zvd across the terminals of the switch TE, connected to the pin ZVD of said slave PWM controller E. The putting of the slave converter ConvE in the OFF state, that is to say turning off the switch TE, is controlled by the master converter ConvM, as a function of measurements of the magnitude Im via the resistor Rshunt connected to the pins CS_P and CS_N of the master PWM controller M of the master converter ConvM.

The master PWM controller M then controls the slave PWM controller E by a control signal indicating that the switch TE must be turned off in order to switch the slave converter ConvE into its OFF state. The control signal is sent on the SYNC pin of the master PWM controller M when the magnitude Im of the current in the switch TM reaches its preset value. It is understood that this preset current magnitude Im makes it possible to control a phase-shift between the currents in the switch TM and in the switch TE. In particular, a preset value of between one third and two thirds of the peak value Imc makes it possible to establish a phase-shift of about one half-period making it possible to reduce the current ripple.

The master PWM controller M works with its pin ZVD for detecting a zero voltage zvd and with its resistor Rshunt for measuring the magnitude Im. The PWM controller M switches off the slave PWM controller E by placing the control signal on its SYNC pin, connected to the SHUTDOWN pin of the PWM controller E.

The slave PWM controller E works with its ZVD pin for detecting a zero voltage zvd and with its SHUTDOWN pin for receiving the control signals from the PWM controller M. The control signal applied to the SHUTDOWN pin initiates the turning off, by said slave PWM controller E, of the switch TE.

The invention allows the control of two converters operating at variable frequency whilst retaining the quasi-resonant mode, that is to say zero drain voltage switching for both structures.

In the invention, the control, in quasi-resonant and current mode, is carried out by a signal to put the slave E in the OFF state, this slave remaining autonomous with regard to switching to the ON state by its own detection of the zero drain voltage. Due to the invention, the totality of the control and the management of particular events is carried out by a single logic signal.

The invention claimed is:

1. A method of operating an electronic circuit (10), said circuit comprising two static converters (ConvM; ConvE), one of them being a master converter (ConvM) notably comprising a master PWM controller (M) and a switch (TM) and the other being a slave converter (ConvE) notably comprising a slave PWM controller (E) and a switch (TE), designed to step up an input voltage (Vin) of the circuit in order to deliver a higher output voltage (Vout), each of said converters having respective zero-voltage detection, and operating in a quasi-resonant mode by zero-voltage switching of their respective switch (TM; TE), the method comprising:
   the master PWM controller (M) sends, when the switch (TM) of said master converter (ConvM) is turned on and when a preset phase-shift criterion is met, a control signal to the slave PWM controller E which, in response to said control signal, turns off (OFF) the switch (TE) of said slave converter (ConvE);
   the master PWM controller (M) and the slave PWM controller (E) turn on (ON) the respective switch (TM; TE) of their respective converter (ConvM; ConvE) as soon as a zero voltage (zvd) is detected across the terminals of said respective switch (TM; TE);
   wherein a magnitude (Im) of an electric current in the switch TM of the master converter (ConvM) is measured, and the preset phase-shift criterion is met when said measured magnitude (Im) reaches a preset value.

2. The method as claimed in claim 1, characterized in that the preset value is between one third and two thirds of a preset peak value (Imc) of said electric current in the switch (TM) of the master converter (ConvM).

3. The method as claimed in claim 1, characterized in that the input voltage (Vin) of the electronic circuit (10) is filtered by means of a low-pass filter (F).

4. The method as claimed in claim 1, characterized in that the master PWM controller (M) keeps the switch (TE) of the slave converter (ConvE) turned off, during a predefined operating phase of the circuit, as long as an output voltage (Vout) of the circuit exceeds a preset value.

5. The method as claimed in claim 2, characterized in that the input voltage (Vin) of the electronic circuit (10) is filtered by means of a low-pass filter (F).

6. The method as claimed claim 2, characterized in that the master PWM controller (M) keeps the switch (TE) of the slave converter (ConvE) turned off, during a predefined operating phase of the circuit, as long as an output voltage (Vout) of the circuit exceeds a preset value.

7. The method as claimed in claim 3, characterized in that the master PWM controller (M) keeps the switch (TE) of the slave converter (ConvE) turned off, during a predefined operating phase of the circuit, as long as an output voltage (Vout) of the circuit exceeds a preset value.

8. An electronic circuit (10) comprising:
   two static converters (ConvM; ConvE), one of them being a master converter (ConvM) notably comprising a master PWM controller (M) and a switch (TM) and the other being a slave converter (ConvE) notably comprising a slave PWM controller (E) and a switch (TE), designed to step up an input voltage (Vin) of the circuit in order to deliver a higher output voltage (Vout), each of said converters having respective zero-voltage detection, and operating in a quasi-resonant mode by zero-voltage switching of their respective switch (TM; TE), in which:
   the master PWM controller (M) is configured to send, when the switch (TM) of said master converter (ConvM) turned on and when a preset phase-shift criterion is met, a control signal to the slave PWM controller (E), said slave PWM controller (E) being configured to turn off (OFF) the switch (TE) of said slave converter (ConvE) in response to said control signal;
   the master PWM controller (M) and the slave PWM controller (E) are configured to turn on (ON) the respective switch (TM; TE) of their respective converter (ConvM; ConvE) as soon as a zero voltage (zvd) is detected across the terminals of said respective switch (TM; TE); and
   means for measuring a magnitude (Im) of an electric current in the switch (TM) of the master converter (ConvM), wherein the preset phase-shift criterion is met when said measured magnitude (Im) reaches a preset value.

9. The electronic circuit as claimed in claim 8, further comprising a low-pass filter (F) designed to filter the input voltage (Vin) of the circuit, said filter preferably comprising an inductor coil (Lfil) and two capacitors (Cfi11; Cfi12).

10. The electronic circuit as claimed in claim 8, characterized in that the Master PWM controller (M) is configured to keep the switch (TE) of the slave converter (ConvE) turned off, during a predefined operating phase of the circuit, as long as the output voltage (Vout) of said circuit exceeds a preset value.

11. The electronic circuit as claimed in claim 8, wherein the electronic circuit is utilized within a motor vehicle.

12. The electronic circuit as claimed in claim 9 characterized in that the Master PWM controller (M) is configured to keep the switch (TE) of the slave converter (ConvE) turned off, during a predefined operating phase of the circuit, as long as the output voltage (Vout) of said circuit exceeds a preset value.

13. The electronic circuit as claimed in claim 9, wherein the electronic circuit is utilized within a motor vehicle.

14. The electronic circuit as claimed in claim 10, wherein the electronic circuit is utilized within a motor vehicle.

* * * * *